United States Patent
Brown (10) Patent No.: US 9,880,803 B2
(45) Date of Patent: Jan. 30, 2018

(54) AUDIO BUFFERING CONTINUITY

(71) Applicant: International Business Machines Corporation, Armonk, NY (US)

(72) Inventor: Michael Sean Brown, Wahroonga (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/091,929

(22) Filed: Apr. 6, 2016

(65) Prior Publication Data
US 2017/0293460 A1 Oct. 12, 2017

(51) Int. Cl.
G06F 17/00 (2006.01)
G06F 3/16 (2006.01)
H04L 29/06 (2006.01)

(52) U.S. Cl.
CPC .......... *G06F 3/165* (2013.01); *H04L 65/4069* (2013.01); *H04L 65/607* (2013.01)

(58) Field of Classification Search
CPC .... G06F 3/165; H04L 65/4069; H04L 65/607
USPC ........................................................ 700/94
See application file for complete search history.

(56) References Cited

U.S. PATENT DOCUMENTS

| | | | |
|---|---|---|---|
| 7,240,013 B2 | 7/2007 | Kang et al. | |
| 7,577,397 B2 | 8/2009 | Klein | |
| 8,327,011 B2 | 12/2012 | Price | |
| 8,892,228 B2* | 11/2014 | Muesch | G10L 19/005 381/73.1 |
| 2005/0043959 A1* | 2/2005 | Stemerdink | G10L 19/005 704/500 |
| 2009/0106020 A1* | 4/2009 | Khalil | G10L 19/005 704/215 |
| 2012/0284021 A1* | 11/2012 | Miet | G10L 19/005 704/225 |

(Continued)

FOREIGN PATENT DOCUMENTS

| | | |
|---|---|---|
| TW | 200413926 A | 8/2004 |
| WO | 2010049879 A1 | 5/2010 |
| WO | 2015014403 A1 | 2/2015 |

OTHER PUBLICATIONS

"Video Streaming Without Interruption", [online], [retrieved on Dec. 26, 2015]. Retrieved from the Internet <URL:http://www.appexnetworks.com/white-papers/AppEx_VideoDelivery_wp.pdf>, 2013, all pages.

(Continued)

*Primary Examiner* — Hemant Patel
(74) *Attorney, Agent, or Firm* — Law Offices of Ira D. Blecker, P.C.

(57) ABSTRACT

A method of audio buffering continuity which includes downloading by a client device a digital audio stream from a digital source; buffering by the client device the downloaded digital audio stream; playing the digital audio stream from the buffered digital audio stream; when the digital audio stream is interrupted such that there is a gap when the client device is incapable of downloading the digital audio stream, inserting by the client device an audio pattern into the gap wherein the audio pattern has one or more elements of the downloaded digital audio stream; and playing by the client device the audio pattern a plurality of times to form a loop while the digital audio stream is interrupted. Also disclosed is an apparatus and a computer program product.

16 Claims, 6 Drawing Sheets

(56) References Cited

U.S. PATENT DOCUMENTS

2013/0024016 A1* 1/2013 Bhat .................... G11B 27/038
   700/94

OTHER PUBLICATIONS

"AnySong Chord Recognition" (GooglePlay), [online], [retrieved on Mar. 21, 2016[. Retrieved from the Internet <https://play.google.com/store/apps/details?id=com.musprojects.chord>, all pages.
Kileen Cheng et al., "A Beat Synchronization Project", [online], [retrieved on Mar. 21, 2016[. Retrieved from the Internet. <https://www.clear.rice.edu/elec301/Projects01/beat_sync/beatalgo.html>, all pages.
"Presonus Studio One", [online], [retrieved on Mar. 21, 2016[. Retrieved from the Internet. <http://studioone.presonus.com/explore>, all pages.
"A music analysis software:Sonic Visualizer", [online], [retrieved on Mar. 21, 2016[. Retrieved from the Internet. <http://www.musicainformatica.org/resources/a-music-analysis-software-sonic-visualizer.php>, May 22, 2014, all pages.
"Virtual DJ Software—What is virtual DJ?", [online], [retrieved on Mar. 21, 2016[. Retrieved from the Internet. <http://www.virtualdj.com/products/virtualdj/index.html>, all pages.

* cited by examiner

AUDIO BUFFERING CONTINUITY

BACKGROUND

The present exemplary embodiments pertain to streaming of digital media and, more particularly, pertain to exemplary embodiments in which gaps in streamed digital media may be filled with an audio loop pattern constructed from the streamed digital media.

Today much of the media that is consumed is delivered digitally. Previously the predominant way to listen to audio was via AM or FM broadcasts. This has been replaced with terrestrial or satellite digital broadcasts such as DAB+ or DARS, and is now being increasingly replaced by wired or wireless internet streaming audio from services such as Spotify and Pandora. In the past, when radio signals were interrupted by interference such as weather or in areas with poor reception, the radio signal used to slowly deteriorate and then get lost altogether. With digital audio steams today, after the digital signal deteriorates to a certain point the digital audio stream may be lost completely. When the digital signal is reacquired, the digital audio stream may resume playing, sometimes from the same point at which the digital signal was lost. This can cause an effect like the music is being paused and then played again, which in certain circumstances can be disconcerting or at least annoying.

BRIEF SUMMARY

The various advantages and purposes of the exemplary embodiments as described above and hereafter are achieved by providing, according to an aspect of the exemplary embodiments, a method of audio buffering continuity which includes downloading by a client device a digital audio stream from a digital source; buffering by the client device the downloaded digital audio stream; playing the digital audio stream from the buffered digital audio stream; when the digital audio stream is interrupted such that there is a gap when the client device is incapable of downloading the digital audio stream, inserting by the client device an audio pattern into the gap wherein the audio pattern has one or more elements of the downloaded digital audio stream; and playing by the client device the audio pattern a plurality of times to form a loop while the digital audio stream is interrupted.

According to another aspect of the exemplary embodiments, there is provided an apparatus for receiving a digital audio stream. The apparatus includes a microprocessor and an audio processor unit. The audio processor unit includes: a digital signal receiver for receiving a digital audio stream; and an audio stream analyzer to analyze a structure of the digital audio stream to determine one or more elements of the digital audio stream, to create an audio pattern from the one or more elements and to insert the audio pattern into the digital audio stream.

According to a further aspect of the exemplary embodiments, there is provided a computer program product for audio buffering continuity, the computer program product comprising a computer readable storage medium having program instructions embodied therewith, the program instructions executable by a processor to cause the device to perform a method comprising: downloading by a client device a digital audio stream from a digital source; buffering by the client device the downloaded digital audio stream; playing the digital audio stream from the buffered digital audio stream; when the digital audio stream is interrupted such that there is a gap when the client device is incapable of downloading the digital audio stream, inserting by the client device an audio pattern into the gap wherein the audio pattern has one or more elements of the downloaded digital audio stream; and playing by the client device the audio pattern a plurality of times to form a loop while the digital audio stream is interrupted.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
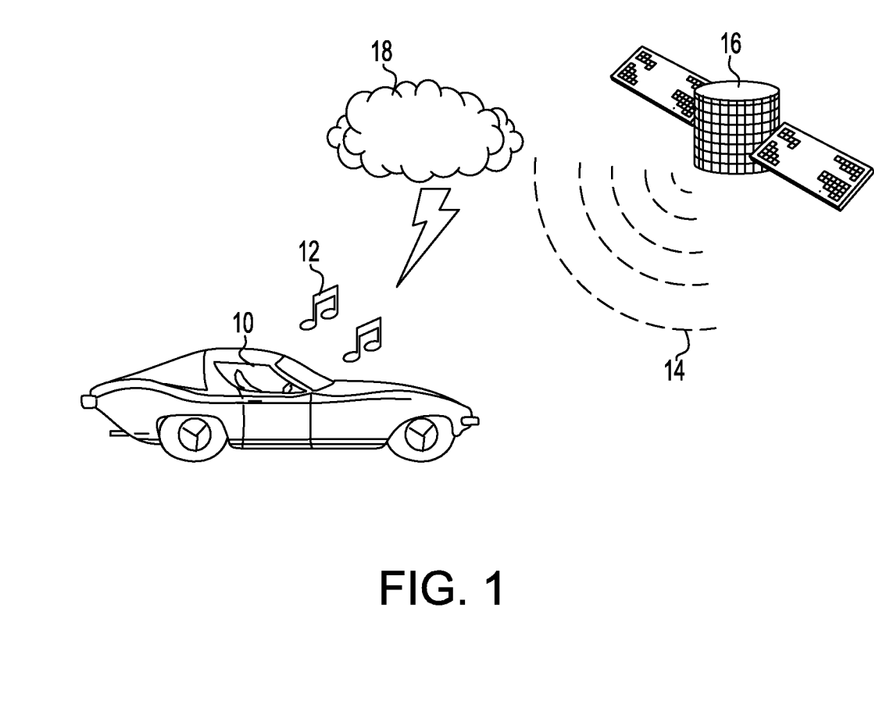
FIG. 1 is an illustration of a vehicle receiving a digital audio stream.

Referring to the Figures in more detail, and particularly referring to FIG. 1, there is illustrated a typical scenario. A vehicle 10, whether moving or not, may be listening to a digital audio stream of music, indicated by musical notes 12. The vehicle 10 may have a suitable receiver, such as a digital radio, that may have the capability to receive a digital signal 14 from, for example, a satellite 16. The digital signal 14 may come from other sources such as, for the purpose of illustration and not limitation, a TCP/IP internet connection, broadband, wireless such as 4G LTE, WiFi, or Bluetooth, wireless mesh and Ethernet.

In scenarios where music may be being streamed digitally, there is always a possibility that the digital audio stream may not keep up with the data rate required to maintain continuous music. This may be due to congested bandwidth, small buffering capability, poor cabling or interference with a wireless signal for example. This may apply to someone listening to music at home, or on their mobile device, or at a club, or in a hotel lobby etc.

For the purposes of illustration and not limitation, the example as shown in FIG. 1 of a driver in a vehicle 10 who may be listening to music 12 on a client device such as a digital satellite radio. Bad weather may be intermittently interfering with the digital audio stream which may cause the music to play for a while, then cut out giving a period of silence and then resuming again. Such a scenario may greatly diminish the enjoyment of listening to the musical selection.

While a musical digital audio stream is described above and below for the purpose of illustration and not limitation, the exemplary embodiments may apply to any digital audio stream.

The exemplary embodiments may perform an analysis of the digital audio stream on the client device, and in the case of a disrupted signal, may create or repeat substitute audio content to maintain continuity of the music being played. By continually sampling the music from the digital audio stream, the client device may determine the structure of a song or audio track. When the digital signal is lost, the client device may use information from the music that has been played and the music remaining in the client device buffer to construct a filler pattern of audio to be played until the digital signal resumes. Essentially, the present exemplary embodiments electronically repeat a hook or phrase over and over while waiting for the digital signal to return.

The exemplary embodiments may utilize a microprocessor or other computing device in the client device to analyze the incoming musical digital audio stream as the digital audio stream is being received by the client device or as the music is being played back on the client device. If suitable music is detected, the microprocessor may proceed to store a copy of the music that has been received and/or already played. If the microprocessor detects a break in the incoming digital audio stream, the microprocessor may analyze both the played audio and the audio that is currently buffered but still to be played. The microprocessor may use a software algorithm to determine the best place in the music to break the current digital audio stream. The best place to break the current digital audio stream may be, for example, on a musical phrase, an end of a verse or an end of a chorus. The microprocessor may also determine a portion of the music that may make a suitable loop pattern. The loop pattern may be, for example, a complete chord section which has been typically repeated in the music previously. The loop pattern may then be processed using existing algorithms to remove undesirable features. Undesirable features may include, but not be limited to, repeating vocals and extraneous noises such as clicks and pops.

Different types of music may lend themselves more to different solutions. For example, classical music may require a section of the music based on chord analysis to be pasted over the break in the incoming digital audio stream. Pop music may be suited to a verse plus chorus replacement. Dance music may sound better with a repeated drum loop and some synthesized sounds to add interest.

While the substitute audio may not be an exact replication of the original digital audio source, the substitute audio may allow for a more natural experience for the listener compared to the disrupted or stuttering alternative which may be commonplace today.

Figure 2:
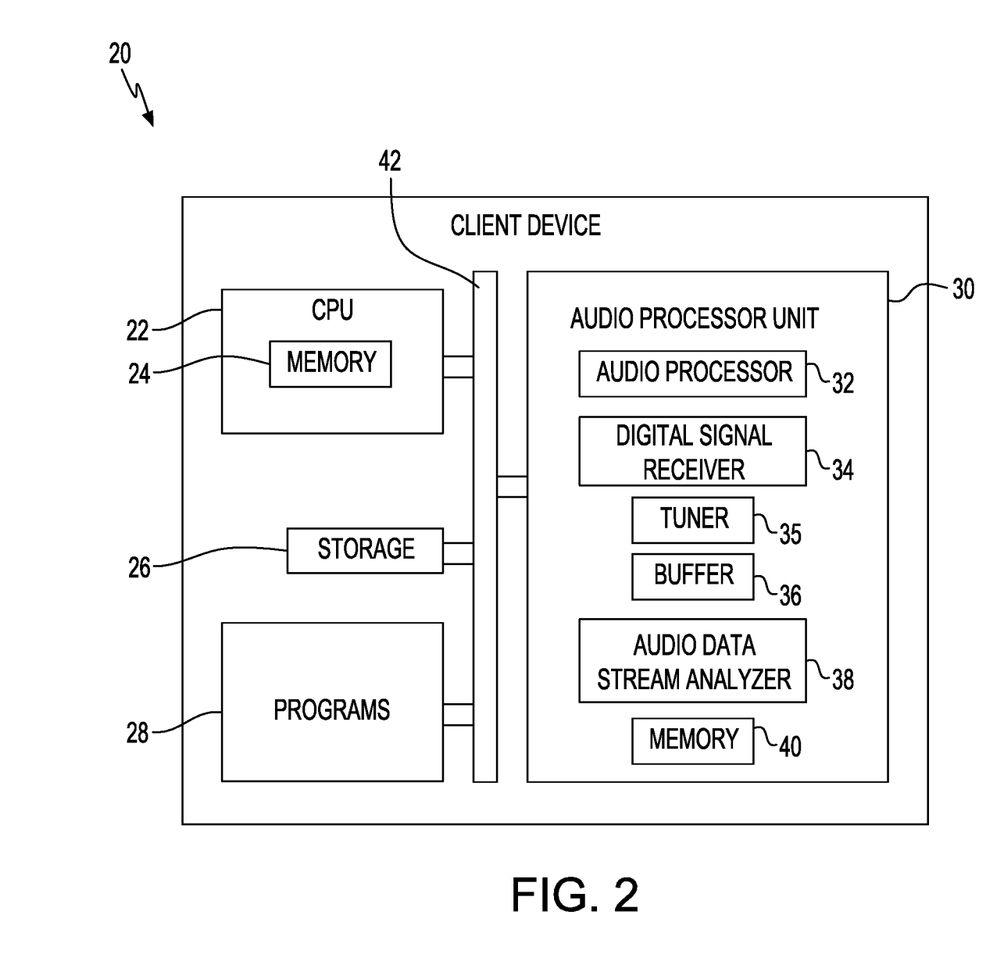
FIG. 2 is an exemplary embodiment of an apparatus for receiving a digital audio stream and for audio buffering continuity.

An exemplary embodiment of a client device 20 is illustrated in FIG. 2. The client device 20 may include a computing device such as a central processing unit (CPU) 22 for handling most of the computer processing functions of the client device 20. The client device 20 may include memory 24 such as random access memory (RAM). Resident in the client device 20, or peripheral to it, may be a storage device 26 of some type such as a hard disk, flash drive, floppy disk drive, CD-ROM drive, tape drive or other storage device.

Further included in client device 20 may be programs 28, including program instructions, that may be tangibly and non-transitorily embodied in storage device 26, memory 24 or peripheral thereto in another storage medium which, when read and executed by the CPU 22, may cause the client device 20 to perform the steps necessary to execute the processes of the exemplary embodiments.

Program instructions may include program instructions for an audio processor unit 30.

The audio processor unit 30 may include an audio processor 32, such as a microprocessor, for performing specific functions pertaining to receiving, tuning, buffering and analyzing digital audio signals and memory 40, such as RAM. In one exemplary embodiment, the audio processor 32 may be a separate microprocessor from the CPU 22. In another exemplary embodiment, the audio processor 32 may be running as a separate process on the CPU 22. The audio processor unit 30 may further include a digital signal receiver 34, a tuner 35, a buffer 36 for receiving and temporarily storing digital audio data and an audio data stream analyzer 38 for analyzing the digital audio data. Bus 42 in the client device 20 may provide an interconnection between the audio processor unit 30, the CPU 22, storage 26 and programs 28.

Client device 20 may include other components not germane to the present exemplary embodiments and thus are not shown for clarity.

Briefly, the audio buffering continuity of the exemplary embodiments may be enabled by the audio processor 32 to analyze the digital audio stream which has been played or is still in the buffer 36 waiting to be played. Depending on the song, metadata may need to be stored covering the song chord structure, and samples of those chords; the beat speed, and a sample loop of the beat; the song structure, such as verse, chorus, bridge etc.; and instruments used. Then, depending on the analysis of the song, the best way to fill in a break in the digital audio stream may be determined. Some examples to fill the break in the digital audio stream may include, but not be limited to: the chord structure looped with samples from the song, or synthesized if no clean samples were obtained; a drum or rhythm fill; a phrase looped with optionally some synthesized sounds over the top to add interest; a complete copy and paste of one or more of the song parts such as a verse plus chorus; or a combination or variation of the above.

Figure 3:
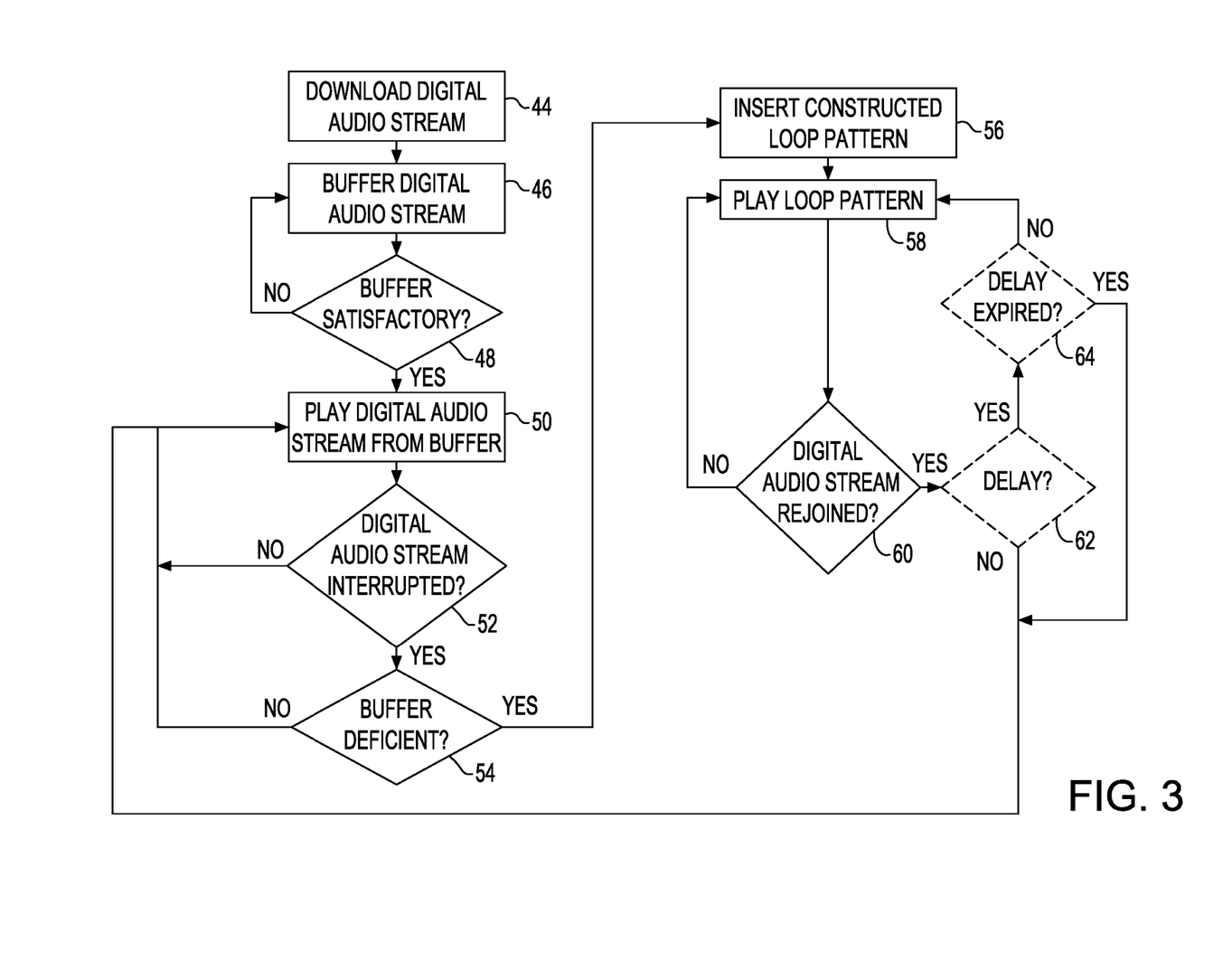
FIG. 3 is a process flow for an exemplary embodiment for audio buffering continuity.

An exemplary embodiment may be described in more detail with respect to FIG. 3 which illustrates a method of audio buffering continuity that may use the client device of FIG. 2. Initially, a digital audio stream may be downloaded to the client device 20, box 44. The digital audio stream may be for a musical arrangement such as a song. The client device 20 may be, for example, a radio, smart phone, or stereo system or any other device capable of receiving digital audio signals.

The digital audio stream may then be buffered by a buffer 36 within the audio processor unit 30, box 46. The buffer 36 may allow the accumulation of the digital audio stream so that when the music is played, the music may play normally without any stuttering that may occur due to variable data download rates.

Next, the determination may be made as to whether the buffer 36 is sufficiently full so that the music may be played, box 48. The buffer 36 need not be 100% filled but may be sufficiently filled so as to avoid the stuttering during playback as described above. If the buffer 36 is not satisfactorily filled, the method may take the "NO" path and return to continue to buffer the digital audio stream, box 46. On the other hand, if the buffer 36 is sufficiently filled, the method may take the "YES" path and proceed to play the digital audio stream (i.e., the music) from the buffer 36, box 50.

The digital audio stream may continue to play and proceed down to box 52. If the digital audio stream has not been interrupted, the "NO" path may be followed and proceed back to box 50 to continue playing the digital audio stream.

However, at some point in time or position, possibly due to weather conditions or passing through a tunnel, for example, the digital audio stream may be interrupted, box 52, and then proceed down the "YES" path. The digital audio stream may continue to play from the buffer 36 until the buffer 36 is empty or nearly empty.

Then, after the digital audio stream may be interrupted, the audio processor unit 30 may need to determine if the buffer 36 is sufficiently filled to continue to support playing the digital audio stream. If the buffer 36 is sufficiently filled, box 54, and thus is not deficient, the "NO" path may be followed and return to box 50 to continue playing the digital audio stream from the buffer 36. If the buffer 36 is deficient, box 54, by either being empty or insufficiently filled, the "YES" path is then followed.

The audio processor 32 watches the buffer 36 and may compare the metadata and samples that the audio processor 32 may have stored, for example in storage 26, from the audio processor's analysis of the digital audio stream. The audio processor 32 may decide the most opportune time to insert the loop pattern. If the audio processor 32 notices the digital audio stream has been, or is likely to be, interrupted or have insufficient bandwidth, then the audio processor may start the loop pattern at the best point in the song structure. The audio processor 32 does not need to wait for the buffer 36 to become completely exhausted. This could mean that the buffer 36 enters this near-empty state at the end of, for example, the second verse, and the audio processor 32 may use a copy of the first chorus as the loop pattern, even though there may be many seconds of good music still in the buffer 36. The audio processor 32 may join back up with the song bridge from the buffer 36 once the digital audio stream has been restored.

When the "YES" path is followed from box 54, an audio loop pattern that is constructed may be inserted into the played digital audio stream, box 56. The creation of the loop pattern will be discussed in more detail hereafter.

The audio loop pattern may be played, box 58, until the digital audio stream is rejoined. The audio processor 32 may continuously or periodically check to see if the digital audio stream has been rejoined, box 60. If the digital audio stream has not been rejoined, the "NO" path is followed and the loop pattern remains inserted into the played digital audio stream and may even be added to. If the digital audio stream has been rejoined, the "YES" path may be followed to play the digital audio stream from the buffer 36, box 50. It may be desirable to insert an optional delay, box 62, before returning to the buffer 36 to play the digital audio stream to allow the buffer 36 to at least partially fill.

If the delay, box 62, is inserted, the loop pattern may play, box 58, until the buffer is sufficiently full. A loop is essentially created where the loop pattern plays and interrogation of the digital audio stream, box 60, repeats and proceeds through the delay decision, box 62, since a delay was previously inserted. The delay, box 62, may be just a time delay which may approximate a time when the buffer 36 is sufficiently full to allow playing of the digital audio stream from the buffer 36. Alternatively, the delay, box 62, may be tied into the buffer 36 such that the delay continues until a signal from the buffer 36 indicates that it is ready to allow playing of the digital audio stream from the buffer 36. If the delay, box 62, has not expired, the "NO" path from box 64 is followed and the loop continues and the loop pattern is played into the digital audio stream, box 58. If the delay has expired, the "YES" path from box 64 is followed and returns to play the digital audio stream, box 50.

If the time to rejoin the digital data stream exceeds a certain length of time, then a new loop pattern may be created, or the previous loop pattern may be modified by adding elements, subtracting elements or changing elements of the loop pattern, and inserted into the played digital audio stream. If the digital audio stream never gets restored, then the loop pattern may be faded out or mixed into another musical selection from another source.

Figure 4:
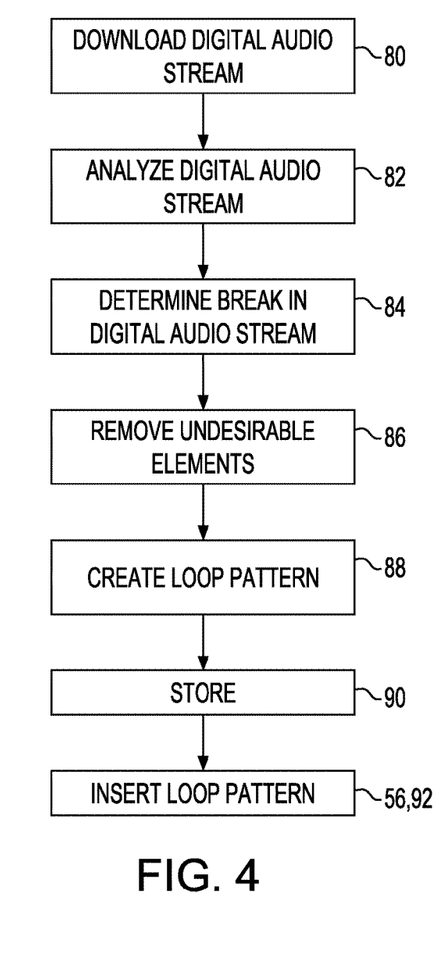
FIG. 4 is a process flow for an exemplary embodiment for inserting a loop pattern for audio buffering continuity.

Referring now to FIG. 4, there is illustrated an exemplary embodiment for inserting the loop pattern as described previously with respect to FIG. 3. Initially, the digital audio stream may be downloaded, box 80. The downloading of the digital audio stream may be the same downloading of the digital audio stream as occurred with the initial step, box 44, of FIG. 3. Alternatively, the downloading of the digital audio stream, box 80, in FIG. 4 may occur separately from the downloading of the digital audio stream as occurred with the initial step, box 44, of FIG. 3.

Figure 5:
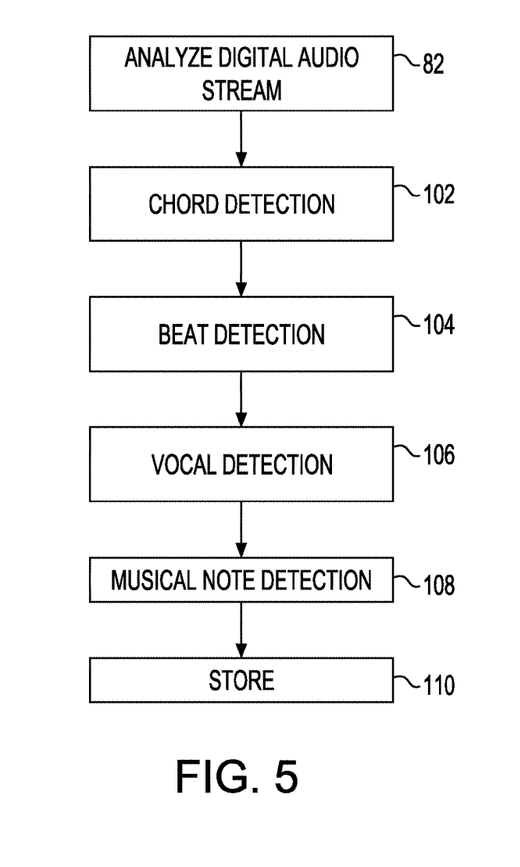
FIG. 5 is a process flow for an exemplary embodiment for analyzing a digital audio stream.

The downloaded digital audio stream may then be analyzed, box 82. There are a number of tools for analyzing the digital audio stream to determine its structure. These tools may be generally categorized as music analysis tools. FIG. 5 illustrates some of these music analysis tools and may include, but not be limited to, tools for chord detection 102, beat detection 104, vocal detection 106, and musical note detection 108. After analysis of the digital audio stream, the analysis may be stored, box 110, in the client device 20 such as in storage 26.

Chords, beats, vocals and musical notes are well known musical terms. Generally speaking, a chord, in music, is any harmonic set of three or more notes that is heard as if sounding simultaneously. In music and music theory, the beat is the basic unit of time, the pulse (regularly repeating event), of the mensural level (or beat level). The beat is often defined as the rhythm listeners would tap their toes to when listening to a piece of music, or the numbers a musician counts while performing. Vocal music is a type of music performed by one or more singers, with or without instrumental accompaniment (a cappella), in which singing provides the main focus of the piece. Vocal music typically features sung words called lyrics. In music, the term note has two primary meanings: A sign used in musical notation to represent the relative duration and pitch of a sound or a pitched sound itself.

There are numerous tools available, either free or commercially available, that may analyze a digital audio stream and provide the inputs for the exemplary embodiments. For example, "AnySong Chord Detection" from GooglePlay may be used for chord detection; beat detection and beat matching is available from Virtual DJ Software (Atomix Productions). Sonic Visualizer (Musica Informatica) may also be useful for analyzing music.

Referring back to FIG. 4, as the structure of the digital audio stream has been analyzed in FIG. 5, the analysis may be used to determine a likely break in the digital audio stream, box 84. This break may be at the end of a chord section or the end of a verse for example. Alternatively, the break may simply be where the digital audio stream signal was lost.

The digital audio stream may also be analyzed to remove undesirable elements, box 86, such as clicks and pops. Also, it may be desirable to remove vocal elements so that there is not an obvious repeating of a chorus. When audio is chopped up and joined back together in a loop pattern, audio glitches may appear such as the clicks and pops. Audio deglitching may be used to remove such audio glitches. One such tool available for audio deglitching is Studio One (PreSonus Audio Electronics).

Then, a loop pattern may be created, box 88. The loop pattern may be created in a number of ways. In one example, a chord progression from the digital audio stream may be duplicated and inserted into the digital audio stream as the loop pattern. In another example, a chorus from the digital audio stream may be duplicated and inserted into the digital audio stream as the loop pattern. In yet another example, a musical section similar to the digital audio stream may be created, such as by making a 4-bar or 8-bar beat section, and inserting this musical section into the digital audio stream as the loop pattern. Other combinations of beat, chords, vocals and musical notes may be formulated and inserted into the digital audio stream as the loop pattern. It is desirable that the beat be continuously maintained between the digital audio stream and loop pattern for the most pleasant listening experience.

The loop pattern created may be stored, box 90, by the audio processor unit 30 in the client device 20 for use at a later time when the digital signal may be lost.

Once the loop pattern has been created, it may be inserted into the digital audio stream as needed, box 92 (also box 56 of FIG. 3).

Figure 6A:
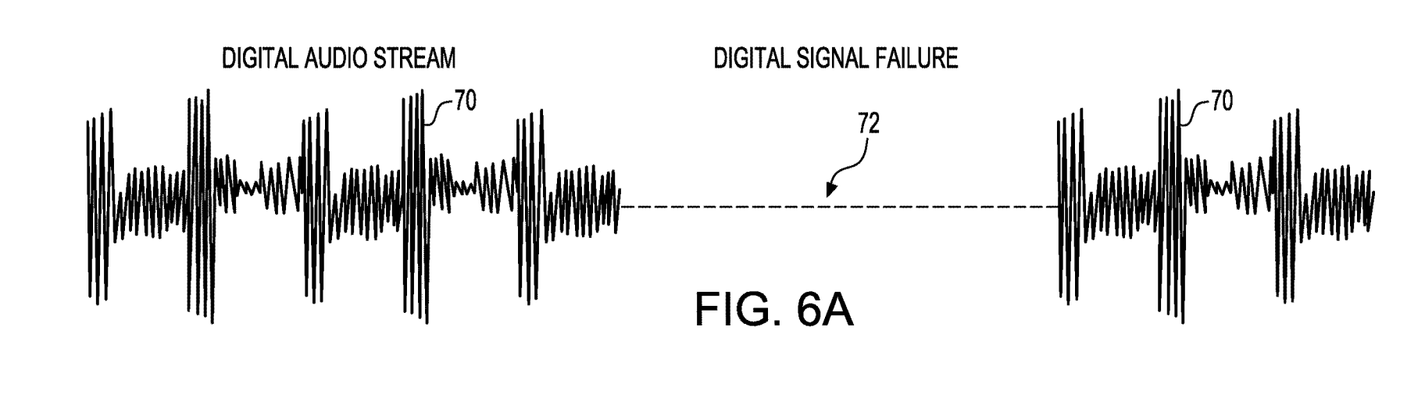
FIG. 6A and FIG. 6B is an illustration of one exemplary embodiment of inserting a loop pattern for audio buffering continuity.
Figure 6B:
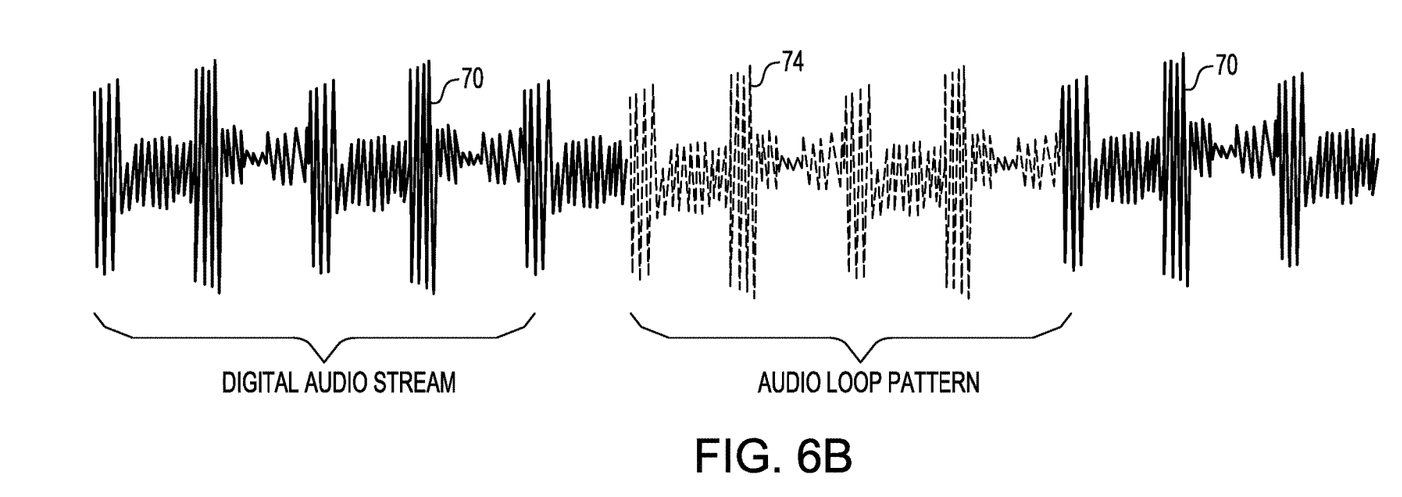

FIGS. 6A and 6B illustrate one exemplary embodiment of inserting the loop pattern into the digital audio stream. FIG. 6A illustrates a digital audio stream 70 which may being played on the client device 20. After a period of time, there may be an interruption in the digital signal which may cause a failure 72 in receiving the digital audio stream. During failure 72, no sound may be received by client device 20. After a period of time, the digital signal may be received again so that the digital audio stream 70 may play again.

FIG. 6B is on the same time line as FIG. 6A. Instead of there being silence of the played digital audio stream due to the digital signal failure 72, a loop pattern 74 may be inserted into the played digital audio stream until the digital signal may be received again so that the digital audio stream 70 may play again normally as illustrated in FIG. 6B.

Figure 7:
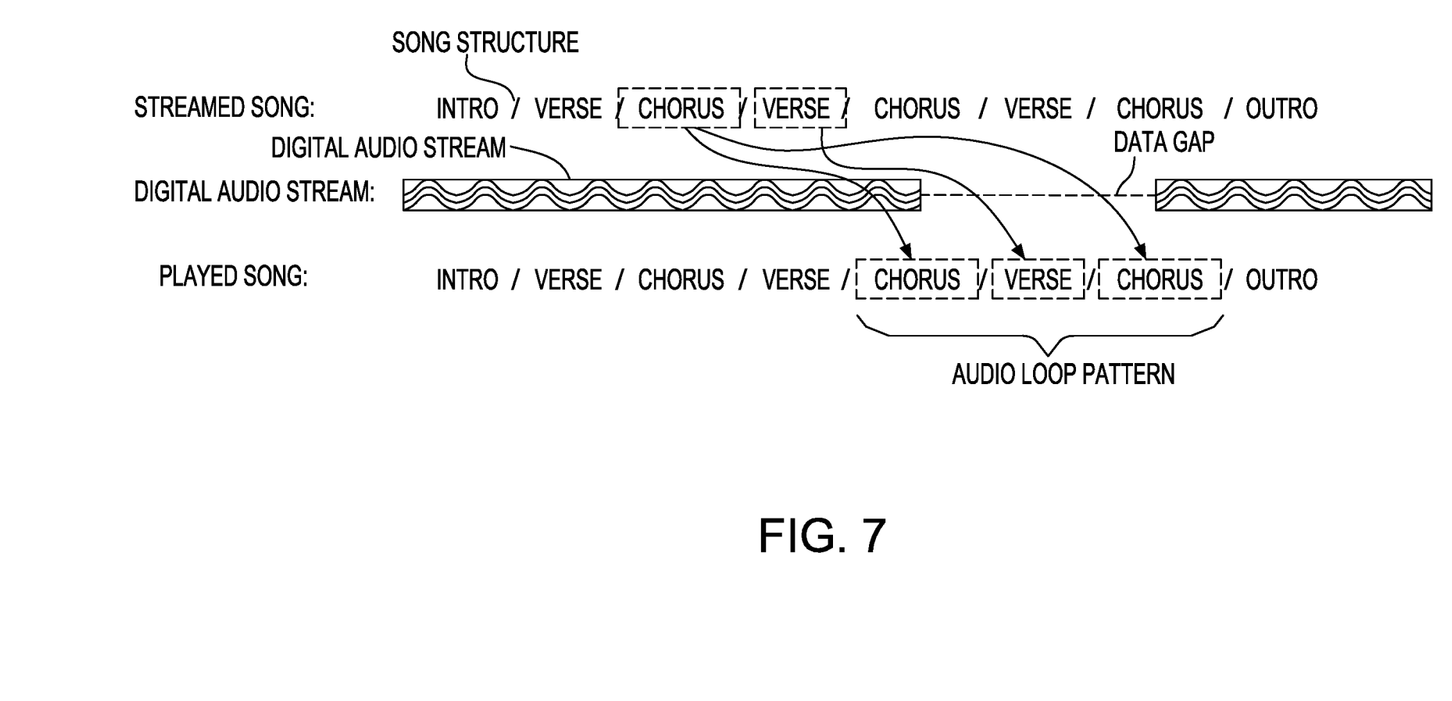
FIG. 7 is an illustration of another exemplary embodiment of inserting a loop pattern for audio buffering continuity.

Referring now to FIG. 7, there is illustrated another exemplary embodiment of inserting the loop pattern into the digital audio stream. In the top part of FIG. 7, there is shown the various components of the streamed musical selection that comprises the digital audio stream. The various components may include, for example, an intro, one or more verses, one or more choruses, a bridge and an outro.

The middle part of FIG. 7 illustrates the digital audio stream having a data gap due to interference or loss of the digital signal. This data gap may be after the second verse so that the following chorus/verse/chorus may not be played due to the interference. To fill the data gap, a loop pattern of chorus-verse-chorus has been created from the original digital audio stream and inserted into the played digital audio stream. The loop pattern may continually play until the interference is removed or the digital audio stream signal has been reacquired.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of audio buffering continuity comprising:
   downloading by a client device a digital audio stream from a digital source;
   buffering by the client device the downloaded digital audio stream;
   playing the digital audio stream from the buffered digital audio stream;
   when the digital audio stream is interrupted such that there is a gap when the client device is incapable of downloading the digital audio stream, inserting by the client device an audio pattern into the gap wherein the audio pattern has one or more elements of the downloaded digital audio stream and wherein the one or more elements of the audio pattern include a musical chord, a musical beat, a musical vocal or a musical note and the audio pattern includes one or more of a chord progression, a chorus, a musical note section and a verse; and
   playing by the client device the audio pattern a plurality of times to form a loop while the digital audio stream is interrupted.

2. The method of claim 1 wherein playing by the client device the audio pattern includes playing by the client device the audio pattern until the digital audio stream is reacquired.

3. The method of claim 1 further comprising:
   checking to see if the digital audio stream has been reacquired;
   when the digital audio stream has not been reacquired, continuing playing by the client device the audio pattern until the digital audio stream is reacquired.

4. The method of claim 1 further comprising:
   checking to see if the digital audio stream has been reacquired; and
   when the digital audio stream has been reacquired, discontinuing playing by the client device the audio pattern and resuming playing the digital audio stream from the buffered digital audio stream.

5. The method of claim 1 further comprising:
   checking to see if the digital audio stream has been reacquired;
   when the digital audio stream has been reacquired, inserting a predetermined delay and continuing playing by the client device the audio pattern;
   responsive to expiring of the predetermined delay, discontinuing playing by the client device the audio pattern and resuming playing the digital audio stream from the buffered digital audio stream.

6. The method of claim 1 wherein inserting the audio pattern in the gap comprises;
   analyzing the digital audio stream to determine the one or more elements of the digital audio stream;
   creating the audio pattern by the client device from the one or more elements; and
   inserting the audio pattern by the client device in the gap so that the audio pattern blends in with the previously played digital audio stream.

7. The method of claim 1 further comprising:
   discontinuing playing the audio pattern; and
   inserting a second audio pattern by the client device into the gap wherein the second audio pattern has one or more elements of the downloaded digital audio stream.

8. An apparatus for receiving a digital audio stream comprising:
   a microprocessor;
   an audio processor unit comprising:
      a digital signal receiver for receiving a digital audio stream; and
      an audio stream analyzer to analyze a structure of the digital audio stream to determine one or more elements of the digital audio stream, to create an audio pattern from the one or more elements and to insert the audio pattern into the digital audio stream wherein the one or more elements of the audio pattern include a musical chord, a musical beat, a musical vocal or a musical note and the audio pattern includes one or more of a chord progression, a chorus, a musical note section and a verse.

9. The apparatus of claim 8 wherein the audio stream analyzer receives the digital audio stream from the digital signal receiver.

10. The apparatus of claim 8 further comprising a buffer for buffering the digital audio stream and wherein the audio stream analyzer receives the digital audio stream from the buffer.

11. The apparatus of claim 8 wherein the audio processor unit further comprises an audio processor separate from the microprocessor, the audio processor processing instructions to operate the audio stream analyzer.

12. A computer program product for audio buffering continuity, the computer program product comprising a non-transitory computer readable storage medium having program instructions embodied therewith, the program instructions executable by a processor to cause the device to perform a method comprising:
    downloading by a client device a digital audio stream from a digital source;
    buffering by the client device the downloaded digital audio stream;
    playing the digital audio stream from the buffered digital audio stream;
    when the digital audio stream is interrupted such that there is a gap when the client device is incapable of downloading the digital audio stream, inserting by the client device an audio pattern into the gap wherein the audio pattern has one or more elements of the downloaded digital audio stream and wherein the one or more elements of the audio pattern include a musical chord, a musical beat, a musical vocal or a musical note and the audio pattern includes one or more of a chord progression, a chorus, a musical note section and a verse; and
    playing by the client device the audio pattern a plurality of times to form a loop while the digital audio stream is interrupted.

13. The computer program product of claim 12 further comprising:
    checking to see if the digital audio stream has been reacquired;
    when the digital audio stream has not been reacquired, continuing playing by the client device the audio pattern until the digital audio stream is reacquired.

14. The computer program product of claim 12 further comprising:
    checking to see if the digital audio stream has been reacquired; and
    when the digital audio stream has been reacquired, discontinuing playing by the client device the audio pattern and resuming playing the digital audio stream from the buffered digital audio stream.

15. The computer program product of claim 12 further comprising:
    checking to see if the digital audio stream has been reacquired;
    when the digital audio stream has been reacquired, inserting a predetermined delay and continuing playing by the client device the audio pattern;
    responsive to expiring of the predetermined delay, discontinuing playing by the client device the audio pattern and resuming playing the digital audio stream from the buffered digital audio stream.

16. The computer program product of claim 12 wherein inserting the audio pattern in the gap comprises;
    analyzing the digital audio stream to determine the one or more elements of the digital audio stream;
    creating the audio pattern by the client device from the one or more elements; and
    inserting the audio pattern by the client device in the gap so that the audio pattern blends in with the previously played digital audio stream.

* * * * *